US009846812B2

United States Patent
Sibiryakov (10) Patent No.: US 9,846,812 B2
(45) Date of Patent: Dec. 19, 2017

(54) IMAGE RECOGNITION SYSTEM FOR A VEHICLE AND CORRESPONDING METHOD

(71) Applicant: Application Solutions (Electronics and Vision) Ltd., Lewes (GB)

(72) Inventor: Alexander Sibiryakov, Lewes (GB)

(73) Assignee: Application Solutions (Electronics and Vision) LTD., Lewes (GB)

( * ) Notice: Subject to any disclaimer, the term of this patent is extended or adjusted under 35 U.S.C. 154(b) by 83 days.

(21) Appl. No.: 14/865,153

(22) Filed: Sep. 25, 2015

(65) Prior Publication Data
US 2016/0104047 A1    Apr. 14, 2016

(30) Foreign Application Priority Data

Oct. 10, 2014    (EP) .................................... 14188398

(51) Int. Cl.
*G06K 9/00*    (2006.01)
*G06T 7/20*    (2017.01)
(Continued)

(52) U.S. Cl.
CPC ..... *G06K 9/00791* (2013.01); *G06K 9/00798* (2013.01); *G06K 9/00805* (2013.01);
(Continued)

(58) Field of Classification Search
CPC .......... G06K 9/00798; G06K 9/00805; G06K 9/4633; G06K 9/00818; G06K 2209/23;
(Continued)

(56) References Cited

U.S. PATENT DOCUMENTS 6,111,993 A * 8/2000 Matsunaga ............. G06T 7/168
382/103
6,466,684 B1 * 10/2002 Sasaki ..................... G06T 7/246
340/435
(Continued)

FOREIGN PATENT DOCUMENTS

DE    102011056671    6/2013
EP    1030188         6/2005

OTHER PUBLICATIONS

Extended European Search Report for European Application No. 14188398.3-1901 mailed Jan. 29, 2015.

*Primary Examiner* — Aklilu Woldemariam
(74) *Attorney, Agent, or Firm* — RatnerPrestia (57) ABSTRACT

An image recognition system and method for a vehicle, including at least two camera units, each being configured to record an image of a road in the vicinity of the vehicle and to provide image data representing the respective image of the road, a first image processor configured to combine the image data provided by the at least two camera units into a first top-view image. The first top-view image is aligned to a road image plane, a first feature extractor configured to extract lines from the first top-view image, a second feature extractor configured to extract an optical flow from the first top-view image and a second top-view image, generated before the first top-view image by the first image processor, and a curb detector configured to detect curbs in the road based on the extracted lines and the extracted optical flow and provide curb data representing the detected curbs.

17 Claims, 6 Drawing Sheets

(51) Int. Cl.
*G06K 9/46* (2006.01)
*G06T 7/215* (2017.01)
*G06T 7/269* (2017.01)

(52) U.S. Cl.
CPC .................. *G06K 9/46* (2013.01); *G06T 7/20* (2013.01); *G06T 7/215* (2017.01); *G06T 7/269* (2017.01); *G06K 9/00* (2013.01); *G06T 2207/10016* (2013.01); *G06T 2207/20061* (2013.01); *G06T 2207/20221* (2013.01); *G06T 2207/30256* (2013.01); *G06T 2207/30261* (2013.01)

(58) Field of Classification Search
CPC ........... G06K 9/00825; G06K 9/00791; G06K 9/3241; G06K 9/00201; G06K 9/46; G06K 9/00369; G06K 9/00348; G06K 9/00221; G06K 9/00154; G06K 9/00288; G06K 9/00906; G06K 9/036; G06T 7/004; G06T 7/2066; G06T 2207/30256; G06T 2207/10016; G06T 7/0042; G06T 7/20; G06T 7/2006; G06T 2207/30241; G06T 2207/30261; G06T 7/215; G08G 1/052; B60R 1/00; B60R 2300/205; B60R 2300/802; B60R 2300/402; B60R 2300/8086; B60R 2300/105; B60R 2300/302; B60W 2420/42; B60W 30/18; G05D 1/0246; G05D 2201/0213; G05D 1/0251; H04N 7/181; H04N 7/183; H04N 5/84; G01S 13/931; G01S 17/936; G01S 2013/9353; G11B 27/11; B42D 25/00; B42D 25/305
USPC ................ 382/103, 104, 118, 119, 140, 148; 348/118, 119, 140, 148
See application file for complete search history.

(56) References Cited

U.S. PATENT DOCUMENTS

| | | | |
|---|---|---|---|
| 6,535,114 B1 | 3/2003 | Suzuki | |
| 9,171,217 B2* | 10/2015 | Pawlicki | .................. G06T 7/13 |
| 2005/0169501 A1 | 8/2005 | Fujii | |
| 2006/0115124 A1* | 6/2006 | Nobori | ...................... B60R 1/00 |
| | | | 382/104 |
| 2006/0217886 A1* | 9/2006 | Fujimoto | .................. G06T 7/20 |
| | | | 701/300 |
| 2007/0127777 A1* | 6/2007 | Fujimoto | ........... G06K 9/00798 |
| | | | 382/104 |
| 2007/0274566 A1* | 11/2007 | Fujimoto | ........... G06K 9/00805 |
| | | | 382/103 |
| 2007/0285217 A1* | 12/2007 | Ishikawa | ........... G06K 9/00805 |
| | | | 340/435 |
| 2008/0273750 A1* | 11/2008 | Fujimoto | ........... G06K 9/00362 |
| | | | 382/103 |
| 2010/0100268 A1* | 4/2010 | Zhang | ................... B60W 30/09 |
| | | | 701/25 |
| 2010/0104137 A1* | 4/2010 | Zhang | ................ G06K 9/00805 |
| | | | 382/104 |
| 2011/0025848 A1* | 2/2011 | Yumiba | ...................... B60R 1/00 |
| | | | 348/148 |
| 2011/0074957 A1* | 3/2011 | Kiyohara | ............... G06K 9/342 |
| | | | 348/148 |
| 2012/0185167 A1* | 7/2012 | Higuchi | ............. G01C 21/3602 |
| | | | 701/461 |
| 2013/0018547 A1* | 1/2013 | Ogata | ................ G06K 9/00825 |
| | | | 701/36 |
| 2014/0226015 A1* | 8/2014 | Takatsudo | ................. B60R 1/00 |
| | | | 348/148 |
| 2014/0313339 A1* | 10/2014 | Diessner | ................... H04N 7/18 |
| | | | 348/148 |
| 2014/0320644 A1 | 10/2014 | Hegemann | |

\* cited by examiner

IMAGE RECOGNITION SYSTEM FOR A VEHICLE AND CORRESPONDING METHOD

CROSS REFERENCE TO RELATED APPLICATIONS

This application claims priority to European Patent Application No. EP14188398, filed Oct. 10, 2014, the contents of such application being incorporated by reference herein.

FIELD OF THE INVENTION

The invention relates to an image recognition system for a vehicle and a corresponding method for recognising images in a vehicle.

BACKGROUND OF THE INVENTION

Although applicable to any system that moves on a surface with kerbs, like vehicles, robots, motion assistance systems for visually impaired people or wheelchairs, the present invention will mainly be described in combination with vehicles.

In modern vehicles a plurality of driver assistance systems provide different assistance functions to the driver. Such driver assistance function range from automatic wiper activation functions to semi-automatic or automatic driving functions for a vehicle.

For complex driver assistance functions, especially where semi-automatic or automatic driving of the vehicle is involved, the respective driver assistance system needs to gather information about the vehicles surroundings, e.g. to avoid collisions when automatically parking a vehicle.

In such driver assistance systems a wide range of sensors can be employed to build a model of the vehicles surroundings. E.g. ultra-sonic distance sensors can be used to measure the distance between the vehicle and an obstacle, or cameras can be used to detect the positions and types of obstacles.

Semi-automatic or automatic driving furthermore requires detection of road limits or kerbs on the road, wherein a kerb represents any physical limit of the road. Knowing such limits and differentiating such limits from simple lines painted on the road is essential in navigation functions of the car control systems, such as lane keeping, autonomous parking, prevention of damage of wheels and vehicle body and the like.

The main types of sensors that are being used for kerb detection in vehicles are: mechanical sensors, infrared sensors, ultrasonic sensors, laser scanners and 3D-cameras.

Each type of sensor has its applicability limits, e.g. regarding resolution, accuracy, response time, power consumption, and cost.

The 3D-camera based solutions usually detect kerbs fairly accurately, but the required computer algorithms use intensive image processing and thus have high computational costs.

A 3D-camera based kerb detection system is e.g. disclosed in document DE 10 2011 056 671 A1, which is incorporated by reference.

Typical 3D-camera based kerb detection systems usually comprise:
1) Kerb hypotheses generation. This step is performed in a single image, wherein nearby parallel line segments (edges) identified by standard edge detectors are clustered to form an initial kerb hypotheses.
2) Validation in 3D. This step is accomplished by using a 3D-camera or stereo-camera. A feature matching algorithm analyses images of the left camera and the right camera in the stereo-rig and generates a set of 3D-points. Considering 3D-point sets on both sides of the kerb hypothesis line, one can determine if there is a real 3D-step between these point sets. If a 3D-step exists, the candidate line is classified as kerb. Otherwise, the candidate line belongs to any planar object in the scene, e.g. it can be a part of road markings painted on the road surface.
3) Validation in time. This step is applied to: a) increase confidence for each detected kerb line, and b) to connect shorter kerb segments into the longer kerb models, and c) to establish tracking capabilities in the system, so that the kerb candidates in the next frame are searched in a restricted area predicted from the previous frames.

The main element of this processing pipeline is a stereo-matching algorithm producing a 3D-point cloud from which the main feature of the kerb, a 3D-step, can be extracted by a robust model fitting algorithm. Such algorithms can only be used with calibrated stereo-rigs, which are not always available in vehicles, and require high computing power.

Accordingly, there is a need for a method and an apparatus for providing a kerb detection system which can be used with simple cameras and requires less computational power.

SUMMARY OF THE INVENTION

The present invention provides an image recognition system and a corresponding method.

Accordingly an aspect of the present invention provides:

An image recognition system for a vehicle, comprising at least two camera units, each camera unit being configured to record an image of a road in the vicinity of the vehicle and to provide image data representing the respective image of the road, a first image processor configured to combine the image data provided by the at least two camera units into a first top-view image, wherein the first top-view image is aligned to a road image plane, a first feature extractor configured to extract lines from the first top-view image, a second feature extractor configured to extract an optical flow from the first top-view image and a second top-view image, which was generated before the first top-view image by the first image processor, and a kerb detector configured to detect kerbs in the road based on the extracted lines and the extracted optical flow and provide kerb data representing the detected kerbs.

Furthermore, an aspect of the present invention provides:

A method for recognising images in a vehicle, comprising recording with at least a first camera unit and a second camera unit at least two different images of a road in the vicinity of the vehicle and providing image data representing the respective images of the road, combining the provided image data into a first top-view image, wherein the first top-view image is aligned to a road image plane, extracting lines from the first top-view image, extracting an optical flow from the first top-view image and a second top-view image, which was generated before the first top-view, detecting kerbs in the road based on the extracted lines and the extracted optical flow, and providing kerb data representing the detected kerbs.

An aspect of the present invention is based on the conclusion that modern vehicles already comprise a plurality of monocular cameras which at present are usually used for simple driver assistance tasks only.

Therefore, an aspect of the present invention uses this and provides an image recognition system which uses a plurality of images of such monocular cameras to provide information and data necessary to perform complex driver assistance tasks.

Consequently, an aspect of the present invention provides an image recognition system with two or more camera units. Each of the camera units records images of a road near the vehicle and provides image data representing the respective image to a first image processor.

The first image processor combines the image data provided by the camera units into a first top-view image. Such a top-view image represents the recorded parts of the road around the vehicle viewed from an elevated position.

The top view image is then processed by a first feature extractor, which extracts lines which are visible in the first top-view image. Lines in the top-view image can be caused by real kerbs or by lines e.g. painted on the road surface. Therefore, lines in the first top-view image are treated as possible kerb candidates.

A second feature extractor extracts an optical flow from the first top-view image and a second top-view image, which was generated before the first top-view image.

Finally, a kerb detector detects kerbs in the road based on the extracted lines and the extracted optical flow. The kerb detector provides kerb data representing the detected kerbs e.g. to other electrical systems in the vehicle which can use the kerb data e.g. to navigate or steer the vehicle. The kerb data can comprise any information that allows the respective vehicle systems to determine the position of the kerb on the road.

Further embodiments of the present invention are subject of the further subclaims and of the following description, referring to the drawings.

In a possible embodiment the first feature extractor is configured to execute a line extraction algorithm, especially a Hough transform algorithm. This allows simple and fast line extraction with little computing effort.

In a possible embodiment the second feature extractor is configured to extract the optical flow as a first set of optical flow vectors based on a sparse optical flow detection from the first top-view image and the second top-view image, especially using feature-matching or block-matching techniques. This allows detecting changes in the images with a very simple and computing cost efficient algorithm.

In a possible embodiment the kerb detector is configured to separate the first set of optical flow vectors into a first subset of optical flow vectors and a second subset of optical flow vectors for every detected line, wherein for each detected line the first subset of optical flow vectors represents flow vectors, which are located on the same side of the respective detected line as the vehicle, and wherein for each detected line the second subset of optical flow vectors represents flow vectors, which are located on the opposite side of the respective detected line as the vehicle. This provides two subsets of flow vectors which each represent one side of the possible kerb and allow separately analysing both sides of the possible kerb.

In a possible embodiment the kerb detector is configured to test for every detected line whether the respective first subset of flow vectors and the respective second subset of flow vectors belong to the same surface and detect a kerb where the respective first subset of flow vectors and the respective second subset of flow vectors do not belong to the same surface. Analysing if the two subsets belong to the same surface allows easily detecting if the subsets of flow vectors belong to surfaces of different heights or orientations.

In a possible embodiment the kerb detector is configured to detect and delete outliers in the first subset of optical flow vectors and/or the second subset of optical flow vectors prior to testing the first subset of optical flow vectors and the second subset of optical flow vectors. Due to possible large errors in feature matching and the possible presence of independently moving objects, some of the flow vectors can be incorrect. These erroneous flow vectors are called "outliers". On the other hand, correctly detected flow vectors are called "inliers". Eliminating "outliers" allows improving the kerb detection and providing more robust results.

In a possible embodiment the kerb detector comprises a motion model calculator, which is configured to calculate at least a fitted global motion model, especially comprising a rotation and a translation, based on the first set of optical flow vectors, especially based on the inline vectors of the first set of flow vectors, and the kerb detector is configured to calculate based on the at least one fitted global motion model for every detected line a first noise distribution for the respective first subset and a second noise distribution for the respective second subset and detect a kerb at the position of the respective line if the difference between the first noise distribution and the second noise distribution exceeds a predetermined threshold. This allows detecting a kerb with little computational effort.

In a possible embodiment the kerb detector comprises a memory configured to store the positions of the detected kerbs in different moments of time and the respective fitted global motion models, and the kerb detector is configured to combine the stored positions of the detected kerbs and the respective fitted global motion models to provide a kerb detection with a stronger evidence of the respective kerb.

In a possible embodiment the image recognition system comprises only one single camera unit, wherein the first image processor is configured to generate the first top-view image based on two consecutive sets of image data which are based on two images consecutively recorded by the single camera unit while the vehicle is in motion. This allows detecting kerbs with only one single camera.

These and other aspects of the invention will be apparent from and elucidated with reference to the embodiments described hereinafter.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE PREFERRED EMBODIMENTS

Figure 1:
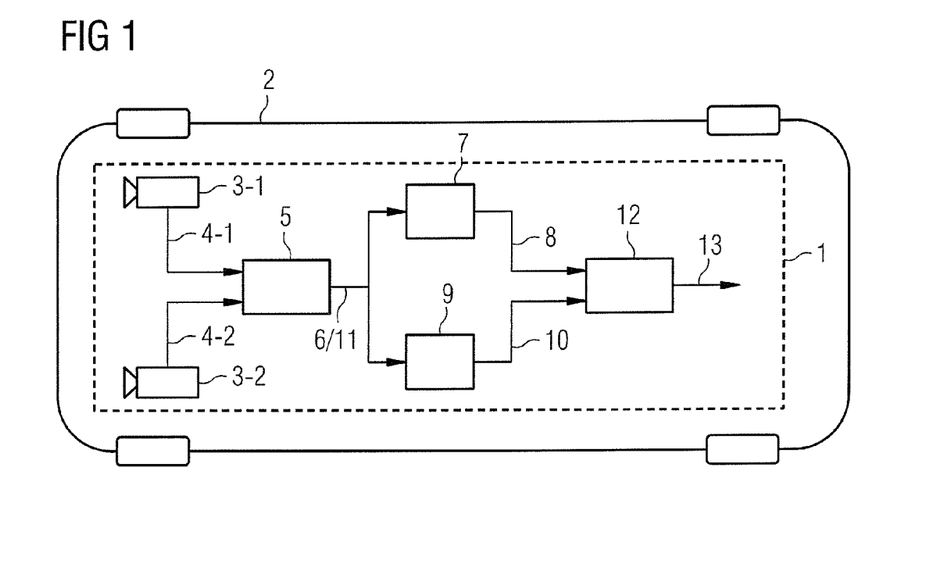
FIG. 1 shows a block diagram of an embodiment of an image recognition system according to an aspect of the present invention.

FIG. 1 shows a block diagram of an embodiment of an image recognition system 1 according to an aspect of the present invention.

The image recognition system 1 of FIG. 1 is installed in a vehicle 2 and comprises two camera units 3-1, 3-2 which are installed in the front of the vehicle 2 and record images of the road (or any other surface on which the vehicle stands or drives) and provide respective image data 4-1, 4-2 to a first image processor 5 which combines the image data 4-1, 4-2 into a first top view image 6. An overlap between the images that form the basis of the image data 4-1, 4-2 is not required.

The first image processor 5 can align the image data 4-1, 4-2 with a global grid in the road plane. As an alternative the image data can be aligned with the global grid by the respective camera units 3-1, 3-2. Such an alignment allows analysing all extracted features, e.g. optical flow vectors and kerb line candidates, in a common coordinate system.

The mapping to the global grid in the road plane can be performed based on the following calculations, wherein pixel (n,m) of the i-th image-data $P_i$ corresponds to a 3D point on the road plane:

$$P_i(n, m) = \begin{bmatrix} (n_i + n)d \\ (m_i + m)d \\ 0 \end{bmatrix}, n = 0 \ldots N_{i-1}, \ m = 0 \ldots M_{i-1} \quad (1)$$

where $(n_i, m_i)$ are integer coordinates of the origin of the respective image data 4-1, 4-2, and $N_i, M_i$ are dimensions of the respective image data 4-1, 4-2, and d—is the ground resolution of the pixel of the respective top-view image. In one embodiment e.g. the resolution d=1 cm can be used.

The 3D points are projected to the original image by equation (2) using known extrinsic and intrinsic calibration data of the camera units 3-1, 3-2, to obtain their pixel coordinates p=(x,y).

The interpolated pixel value of the projected point I(x,y) is then assigned to the pixel P in the top-view image.

The projection equation is:

$$p(n, m) = \begin{bmatrix} x \\ y \end{bmatrix}(n, m) = K_c\left(\begin{bmatrix} R_c & t_c \\ 0 & 1 \end{bmatrix}\begin{bmatrix} P(n, m) \\ 1 \end{bmatrix}\right) \quad (2)$$

where $R_c$ is 3×3 a matrix of rotation of the camera sensor plane with respect to the road plane, $t_c$ is a translation of the camera centre with respect to the origin of the vehicle coordinate system.

$K_c$ is an intrinsic calibration function that maps a ray from the camera centre to a pixel in the sensor. For example, in case of pinhole camera, it is a multiplication with an upper triangular matrix. In case of fisheye camera, it is a non-linear polynomial function.

The first top view image 6 is then provided to a first feature extractor 7 and a second feature extractor 9.

The first feature extractor 7 extracts lines 8 from the first top view image 6. The extracted lines 8 can be treated as kerb candidates because they indicate that at the position of the respective extracted line 8 a kerb could exist on the respective section of the road.

Kerb candidate lines 8 can in one example be extracted by a Hough transformation method that outputs parameters (a, b, c) of straight lines in the image:

$$aX+bY+c=0 \quad (3)$$

The Hough transformation method uses only image intensity and its gradient to detect evidence of lines and therefore cannot distinguish between a real kerb and a line painted on the road.

The Hough transform as used in the present invention provides line parameters and point coordinates in metric space, therefore the value d=aX+bY+c, indicates a metric distance from the coordinate origin, e.g. the vehicle centre C, to the point (X,Y) in the line and vector (a, b) gives a line orientation, which can e.g. be used by a vehicle control system.

The second feature extractor 9 extracts an optical flow 10 from the first top-view image 6 and a second top view image 11 which was recorded before the second top view image 11. In one embodiment the second feature extractor 9 comprises a memory (not shown) to consecutively store the first top-view images 6 received from the first image processor 5 and later use them as second top-view images 11 to calculate the optical flow 10.

In one embodiment the second feature extractor 9 is configured to extract the optical flow 10 as a sparse optical flow 10. For example feature-matching based on interest point extraction and establishing a correspondence between two point sets can be used to extract the sparse optical flow 10. Usually, the largest correlation coefficient between image windows centred at interest points determines the feature correspondences and local optical flow vectors.

In addition or as an alternative block-matching based on dividing video frames into small equal blocks can be used to extract the sparse optical flow 10. This method comprises searching the best-matched block from the first top-view image 6 in all blocks of the second top view image 11, e.g. within a search window.

In FIGS. 4-7 extracted lines 8-1-8-4 and corresponding optical flows 10 are shown in detail.

In FIG. 1 the extracted lines 8 and the optical flow 10 are provided to a kerb detector 12, which based on the extracted lines 8 and the optical flow 10 provides kerb data 13, which represents the detected kerbs e.g. in the metric coordinate system with its origin in the centre of the vehicle 2. The kerb data 13 for example can comprise line parameters a, b and c for a line equation of the type aX+bY+c=0.

In the vehicle 2 a plurality of vehicle systems 25 (not shown in FIG. 1) can make use of the kerb data 13 and for example include the kerb data 13 in their control algorithms.

In one embodiment the image recognition system 1 can be included in one of said vehicle systems 25, e.g. as a computer program module or library that is executed by the processor of the respective vehicle system.

In another embodiment the image recognition system is embodied in a dedicated control unit which can communicate with other vehicle systems 25 e.g. via a vehicle bus like a CAN bus, a FlexRay bus or the like. In yet another embodiment the elements of the image recognition system 1 can be distributed between various control units.

Figure 2:
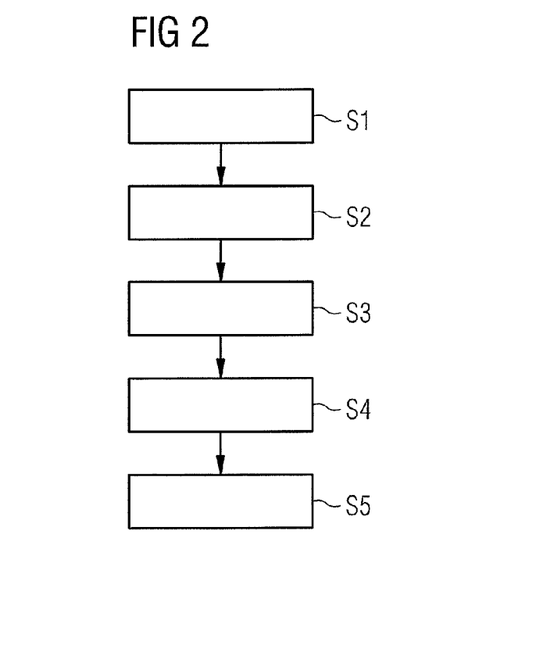
FIG. 2 shows a diagram of an embodiment of a method according to an aspect of the present invention.

FIG. 2 shows a diagram of an embodiment of a method for recognising images in a vehicle 2 according to an aspect of the present invention.

The method comprises recording, S1, with at least a first camera unit 3-1-3-6 and a second camera unit 3-1-3-6 at least two different images of a road in the vicinity of the vehicle 2 and providing image data 4-1-4-6 representing the respective images of the road. Furthermore, the method comprises combining, S2, the provided image data 4-1-4-6 into a first top-view image 6, 6-1-6-4, wherein the first top-view image 6, 6-1-6-4 is aligned to a road image plane. The method further comprises extracting, S3, lines 8, 8-1-8-4 from the first top-view image 6, 6-1-6-4 and extracting, S4, an optical flow 10 from the first top-view image 6, 6-1-6-4 and a second top-view image 11, which was generated before the first top-view. Finally, the method comprises detecting, S5, kerbs in the road based on the extracted lines 8, 8-1-8-4 and the extracted optical flow 10, and providing kerb data 13 representing the detected kerbs e.g. to other vehicle systems 25.

According to one embodiment of the present invention the lines can be extracted with a line extraction algorithm, especially a Hough transform algorithm. The optical flow 10 can e.g. be extracted as a first set 14 of optical flow vectors based on a detection of sparse optical flow 10 from the first top-view image 6, 6-1-6-4 and the second top-view image 11. This can especially be done using feature-matching or block-matching algorithms.

Once the first set 14 of optical flow vectors is extracted, the first set 14 of optical flow vectors can be divided into a first subset 15 of optical flow vectors and a second subset 16 of optical flow vectors for every detected line. This results in a plurality of first subsets 15 and second subsets 16, the number of first subset 15 and second subset 16 pairs being equal to the number of detected lines. The following steps are performed for every detected line 8, 8-1-8-4.

The subsets divide the optical flow vectors into a first group of flow vectors, comprised in the first subset 15, which are on the same side of the respective detected line as the vehicle 2, and a second group of flow vectors, comprised in the second subset 16, which are on the opposite side of the respective detected line compared to the vehicle 2. This allows separately analysing both sides of the line.

If the first subset 15 and the second subset 16 are provided, detecting kerbs can comprise testing for every detected line whether the respective first subset 15 of flow vectors and the respective second subset 16 of flow vectors belong to the same surface. A kerb can be detected where the respective first subset 15 of flow vectors and the respective second subset 16 of flow vectors do not belong to the same surface.

To improve the kerb detection outliers in the first subset 15 of optical flow vectors and the second subset 16 of optical flow vectors can be detected and deleted prior to testing the first subset 15 of optical flow vectors and the second subset 16 of optical flow vectors.

Detecting the kerbs can then comprise calculating at least a fitted global motion model 18, especially comprising a rotation and a translation, based on the first set 14 of optical flow vectors, especially based on the inline vectors of the first set 14 of flow vectors. Then for every detected line 8, 8-1-8-4 a first noise distribution 19 for the respective first subset 15 and a second noise distribution 19 for the respective second subset 16 can be calculated and a can be detected kerb at the position of the respective line 8, 8-1-8-4 if the difference between the first noise distribution 19 and the second noise distribution 19 exceeds a predetermined threshold X. The noise distributions 19 can be calculated based on the fitted global motion model 18.

In one embodiment the positions of the detected kerbs in different moments of time can be stored together with the respective fitted global motion models 18. Furthermore, when detecting kerbs the stored positions of the detected kerbs and the respective fitted global motion models 18 can be combined to provide kerb detection with a stronger evidence of the respective kerb.

Figure 3:
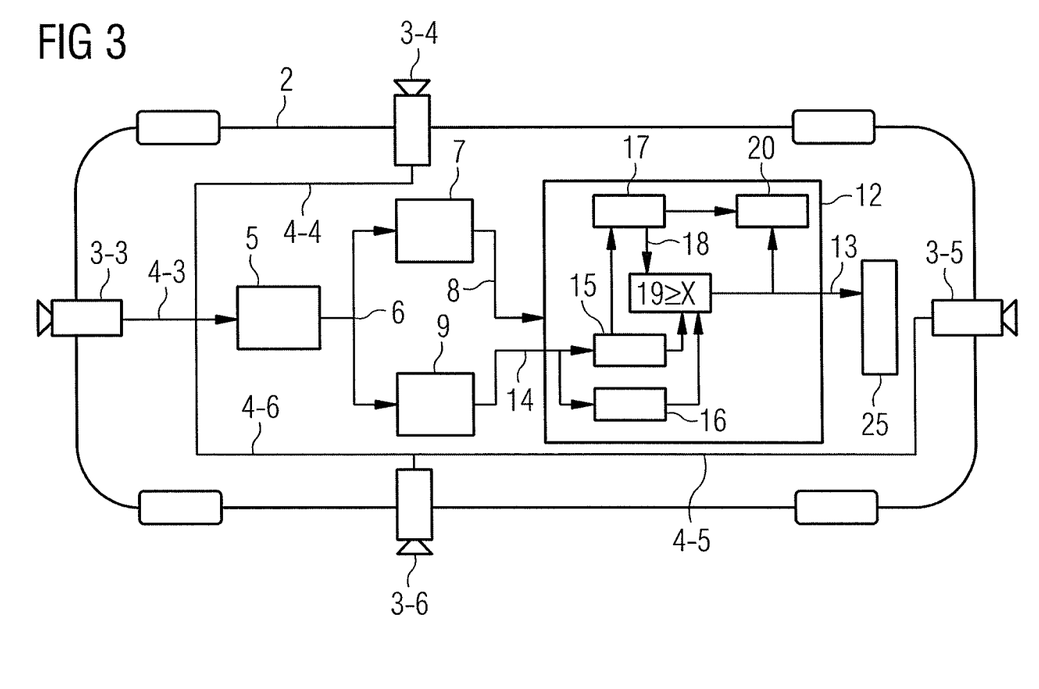
FIG. 3 shows a block diagram of another embodiment of an image recognition system according to an aspect of the present invention.

FIG. 3 shows a block diagram of another embodiment of an image recognition system 1 according to the present invention.

The image recognition system 1 of FIG. 3 is based on the image recognition system 1 of FIG. 1, but comprises four camera units 3-3-3-6, wherein one camera unit 3-3-3-6 is oriented to each side of the vehicle 2, respectively. Furthermore, the second feature extractor 9 of FIG. 3 provides the first set 14 of flow vectors to the kerb detector 12 of FIG. 3 and the kerb detector 12 is configured to separate the first set 14 of flow vectors into the first subset 15 and the second sub set 16 of flow vectors.

To test whether the first subset 15 and the second subset 16 belong to the same surface the kerb extractor 12 comprises a motion model calculator 17, which calculates a fitted global motion model 18 based on the first set 14 of optical flow vectors. Before calculating the fitted global motion model 18 the kerb extractor can delete "outliers" from the first set 14 of optical flow vectors.

Based on the global motion model 18 the kerb detector 12 calculates for every detected line 8, 8-1-8-4 a first noise distribution 19 for the respective first subset 15 and a second noise distribution 19 for the respective second subset 16. A kerb is detected by the kerb detector 12 at the position of the respective line 8, 8-1-8-4 if the difference between the first noise distribution 19 and the second noise distribution 19 exceeds a predetermined threshold X.

The kerb data 13 for the detected kerbs is then provided to a vehicle control system 25, which e.g. can be a control system 25 providing autonomous or semi-autonomous driving in the vehicle 2.

In one embodiment separating the first set 14 of optical flow vectors can be performed as described below.

A line 8, 8-1-8-4 divides the optical flow vectors in two subsets 15, 16:

$$\{v\} = \{v\}_{road} \cup \{v\}_{non\text{-}road} \quad (4)$$

wherein $\{v\}_{road}$ represents the optical flow vectors on the same side of the line 8, 8-1-8-4 as the vehicle 2. Consequently, $\{v\}_{non\text{-}road}$ represents the optical flow vectors on the opposite side of the line 8, 8-1-8-4 as the vehicle 2.

When reference is made here to the vehicle the reference refers to the centre of the vehicle C=(Cx, Cy). The separation of the first set 14 of flow vectors is given by the condition:

$$\operatorname{sign}(as_x + bs_y + c) = \operatorname{sign}(a(s_x + v_x) + b(s_y + v_y) + c) = \operatorname{sign}(aC_x + bC_y + c) \quad (5)$$

If the two subsets 15 and 16, or $\{v\}_{road}$ and $\{v\}_{non\text{-}road}$, belong to different surfaces the respective detected line 8, 8-1-8-4 is a kerb boundary.

To increase the reliability of this test, all erroneous vectors "outliers" can be removed from the first set 14 of optical flow vectors and the second set 15 of optical flow vectors, as already described above. To detect outliers the global motion model 18 is fitted by the RANSAC estimator.

The global motion between the first top-view image 6 and the second top-view image 11 consists of three independent parameters: a rotation angle and a 2D-translation in two directions X, and Y. A corresponding global motion matrix H=[R|T] consists of a 2×2 rotation matrix R, and a 2×1 translation vector T, so that a point (x, y) in the first top-view image 6 is moved to another point (x', y') in the second top-view image 11 according to:

$$\begin{bmatrix} x' \\ y' \end{bmatrix} = R \begin{bmatrix} x \\ y \end{bmatrix} + T = H \begin{bmatrix} x \\ y \\ 1 \end{bmatrix} \quad (6)$$

Optical flow vectors connecting points (sx, sy) and (sx+vx, sy+vy) in the first top-view image 6 and the second top-view image 11 provide multiple instances of the formula (7) with an additional term of measurement noise $\epsilon$:

$$\begin{bmatrix} s_x + v_x \\ s_y + v_y \end{bmatrix} = R \begin{bmatrix} s_x \\ s_y \end{bmatrix} + T + \varepsilon \quad (7)$$

The fitted global motion model 18 can be estimated from the over-determined system (8) by a RANSAC algorithm, comprising the following steps:
(1) Select two vectors v1 and v2 randomly from the set {v};
(2) Find a candidate motion H directly from v1 and v2;
(3) Count the number of vectors $N_{inliers}$ in {v} satisfying H;
(4) Repeat (1)-(3) until maximum of $N_{inliers}$ is found with a high probability;
(5) Re-estimate the final fitted global motion model 18 from all inliers using a least-squares minimisation.

RANSAC can be applied separately to the first subset 15 of motion vectors and the second subset 16 of motion vectors resulting in motion matrices $H_{road}$ and $H_{non-road}$ and four disjoint sets of optical flow vectors:

$$\{v\}_{road} = \{v\}_{road,inliers} \cup \{v\}_{road,outliers}$$

$$\{v\}_{non-road} = \{v\}_{non-road,inliers} \cup \{v\}_{non-road,outliers} \quad (8)$$

Assuming $H_{road} = [R_{road}|T_{road}]$ is a correct model of the road motion computed from $\{v\}_{road,inliers}$, a new noise-free first subset 15 and second subset 16 of optical flow vectors can be computed using only position information from $\{v\}_{road,inliers}$ and $\{v\}_{non-road,inliers}$:

$$v_{noise-free} = (s_x, s_y, v_x^*, v_y^*) \quad (9)$$

$$\begin{bmatrix} v_x^* \\ v_y^* \end{bmatrix} = (R_{road} - I) \begin{bmatrix} s_x \\ s_y \end{bmatrix} + T_{road}$$

$$\{v\}_{noise-free} = \{v\}_{road,inliers,noise-free} \cup \{v\}_{non-road,inliers,noise-free}$$

The vector length l of the optical flow vectors is defined as $l = \sqrt{v_x^2 + v_y^2}$, or $l = |v_x| + |v_y|$. The length difference between the real vector and its noise-free version is:

$$\Delta l = l - l_{noise-free} \quad (10)$$

The criterion for a kerb candidate validation can be based for example on empirical distributions of $\Delta l$, computed over sets $\{v\}_{road,inliers}$ and $\{v\}_{non-road,inliers}$.

This will be further explained in the following figures.

Figure 4:
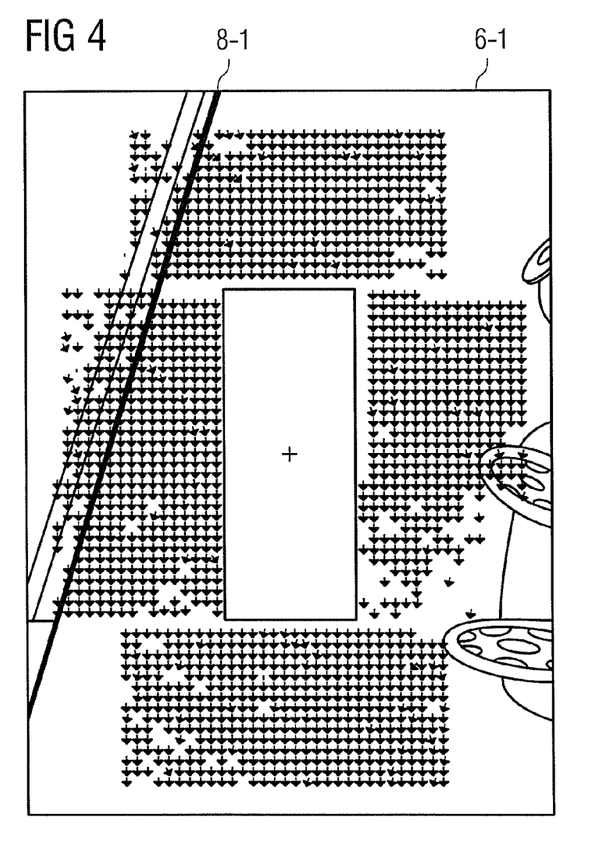
FIG. 4 shows a top-view image as used in an embodiment of the present invention.
Figure 5:
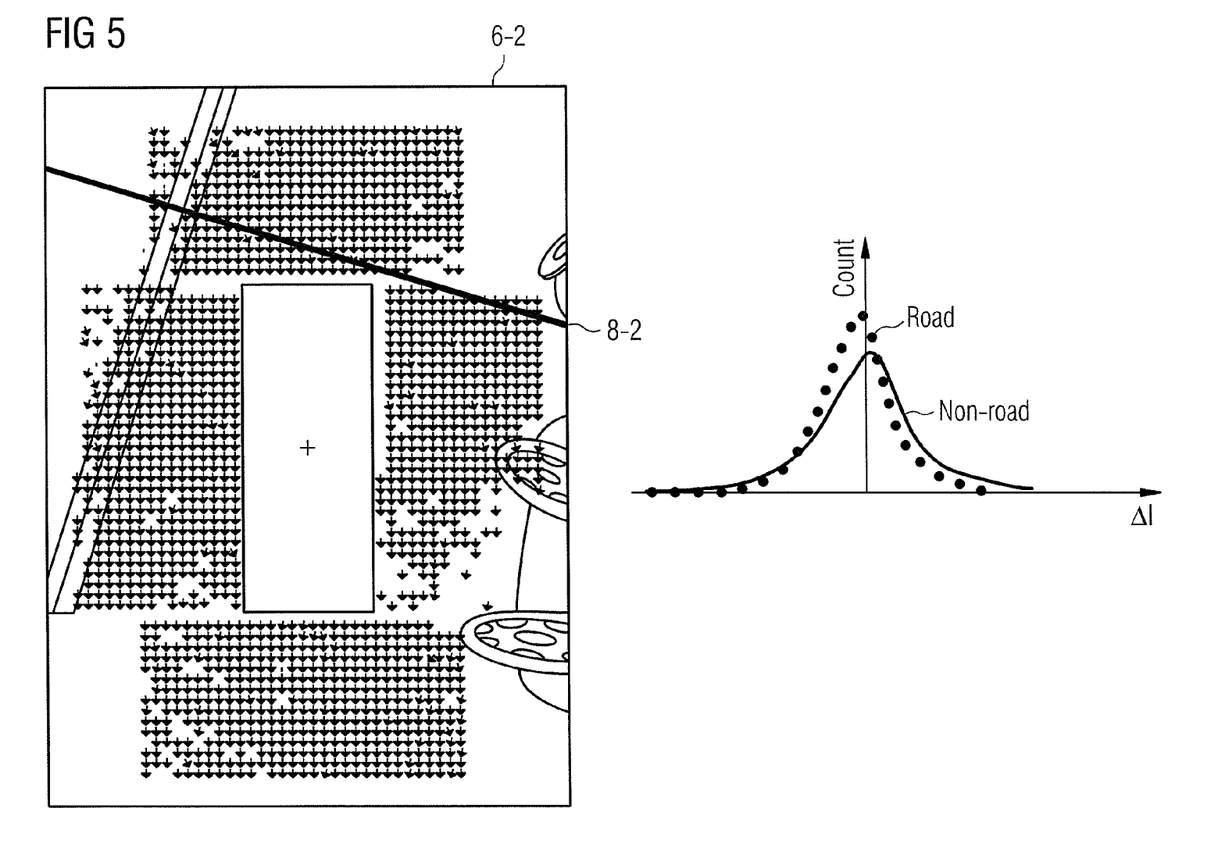
FIG. 5 shows a top-view image as used in an embodiment of the present invention.
Figure 6:
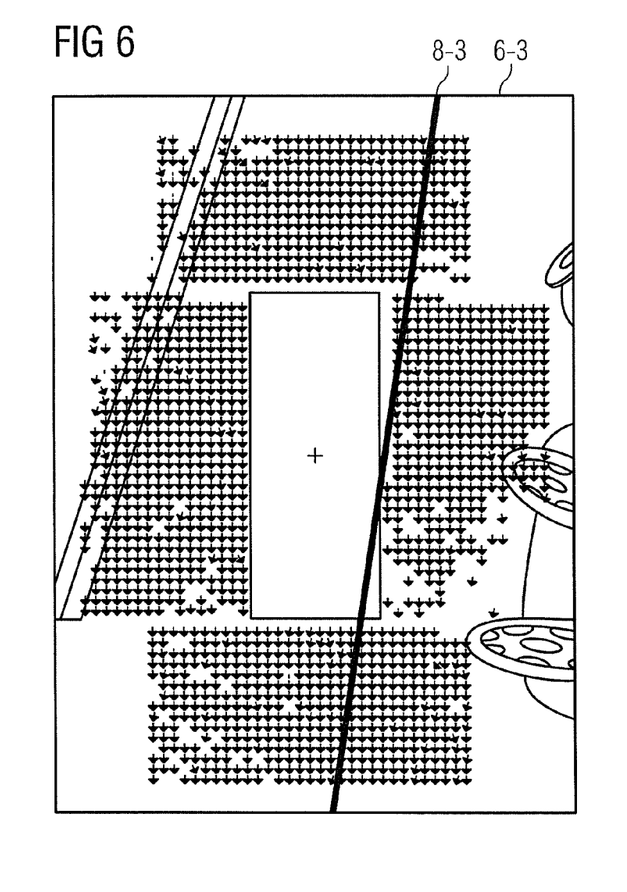
FIG. 6 shows a top-view image as used in an embodiment of the present invention.

FIGS. 4 to 6 show top-view images as used in an embodiment of the present invention, each with a detected line 8-1-8-4, together with the respective distribution of $\Delta l$.

In FIG. 4 a kerb is present in the first top-view image 6-1, and the detected line 8-1 is a real kerb boundary. The estimated motion models $H_{road}$ and $H_{non-road}$ describe motions of different planes: the road and the pedestrian walk.

The vectors in $\{v\}_{road, inliers}$ and $\{v\}_{road, inliers, noise-free}$ differ in their measurement noise, so that the distribution of $\Delta l$ for the vectors in $\{v\}_{road, inliers}$ is concentrated around zero.

All vectors in $\{v\}_{non-road, inliers}$ are longer than $\{v\}_{non-road, inliers}$ because the pedestrian walk is elevated above the road and therefore is closer to the camera. This systematic increase of vector lengths of the non-road vectors results in significant shift of the $\Delta l$ histogram to the right.

In FIG. 5 a kerb is present in the first top-view image 6-2. But in contrast to FIG. 4 the detected candidate line 8-2 crosses both the road and the kerb.

The motion models $H_{road}$ and $H_{non-road}$ are estimated based on both road and pedestrian walk optical flow vectors. Therefore, they both correspond to the motion of non-existent planes, fitted to minimise the difference between road and non-road vectors.

As a result, the vectors in $\{v\}_{non-road, inliers}$ and $\{v\}_{non-road, inliers, noise-free}$ are equal but for measurement noise and approximation errors.

The same is true for the vectors in $\{v\}_{road, inliers}$ and $\{v\}_{road, inliers, noise-free}$. Both histograms for $\Delta l$ in FIG. 5 are concentrated near zero, and there is no systematic difference between them, which could be detected.

In FIG. 6 a kerb is present in the first top-view image 6-3, but the detected candidate line 8-3 belongs to the road. In this case, $H_{road}$ and $H_{non-road}$ describe different motions: $H_{non-road}$ is the correct motion of the road surface, whereas $H_{road}$ corresponds to the motion of a non-existent plane obtained by averaging motions of the road and pedestrian walk. Thus, vectors in $\{v\}_{non-road, inliers}$ and $\{v\}_{non-road, inliers, noise-free}$ are equal, but many vectors in $\{v\}_{road, inliers}$ are longer than $\{v\}_{road, inliers, noise-free}$ because the kerb vectors correspond to the motion of the plane above the road. The histogram of $\Delta l$ for the road vectors is insignificantly shifted to the right.

Figure 7:
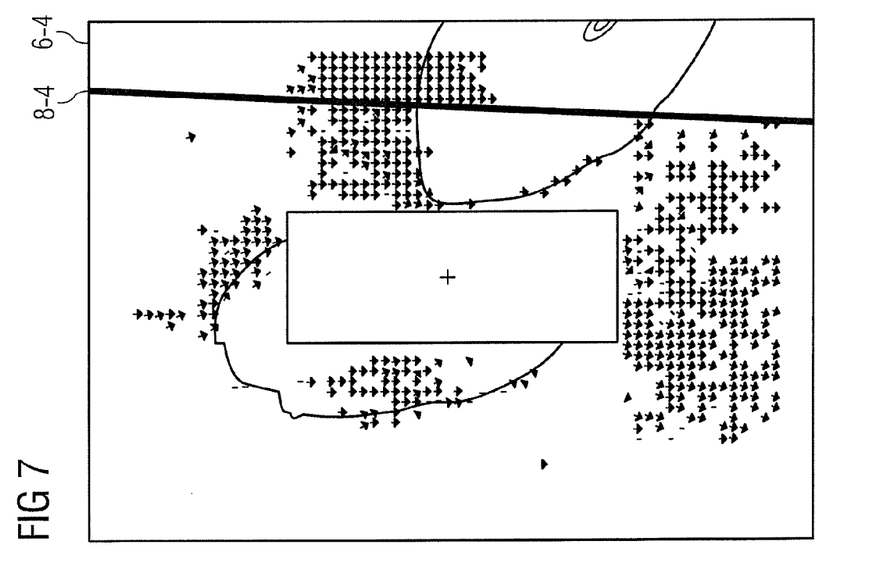
FIG. 7 shows a top-view image as used in an embodiment of the present invention.

Finally, in FIG. 7 there is no kerb to be detected present in the first top-view image 6-4. Therefore, the detected candidate line 8-4 belongs to the road. Consequently, $H_{road}$ and $H_{non-road}$ describe the same correct motion of the road surface. In this case both histograms of $\Delta l$ are similar, because vectors in $\{v\}_{road, inliers}$ and $\{v\}_{road, inliers, noise-free}$ are equal but for the measurement noise, and the same is true for non-road part.

In one embodiment to validate a line candidate as a kerb the condition "the distribution of $\Delta l_{non-road}$ is shifted to the right compared to the distribution of $\Delta l_{road}$" can be evaluated.

Because this shift may be small, around just 1-2 pixels, and due to different shapes of distributions, this shift cannot be computed from statistical values, such as the mean value and the variance.

Therefore, the Kolmogorov-Smirnov test, K-S, which was designed for such cases, can be used.

The K-S statistic for a detected line
L, 8, 8-1-8-4 is defined as:

$$KS(L) = \sqrt{\frac{n_{road} n_{non-road}}{n_{road} + n_{non-road}}} \max_{\text{all shifts } d} (F_{\Delta l_{road}}(d) - F_{\Delta l_{non-road}}(d)) \quad (11)$$

where $n_{road}$, $n_{non-road}$ are the number of vectors in $\{v\}_{road,\ inliers}$ and $\{v\}_{non-road,\ inliers}$ respectively, and F is the cumulative distribution obtained by integrating the respective histograms of Δl.

If K-S(L) is greater than the threshold x which is greater than 0, the respective line L, 8, 8-1-8-4, is considered to be a kerb and the matrix $H_{road}$ corresponding to the respective line L, 8, 8-1-8-4 is considered to represent the correct motion of the road in the current frame.

The threshold value can be taken from the table of critical values of the Kolmogorov distribution or selected experimentally.

If many parallel candidate lines 8, 8-1-8-4 are detected near each other, the best candidate line L, 8, 8-1-8-4 is selected from the K-S(L) statistics as follows:

$$L^* = \underset{L \in Cluster\ of\ lines}{\mathrm{argmax}}\ KS(L) \quad (12)$$

The described steps result in a set of detected lines or kerb boundaries.

To make detection results more stable and to obtain stronger evidence of the kerb, object clustering in time can be performed as already indicated above. The global motion matrix $H_{road}$ transforms pixels from the current top-view image m to the previous top-view image m−1. Denoting such transformation by $H_{m-1,m}$, a transformation between a current first top view image 6 and any preceding second top-view image 11 can be described as a chain of matrix products:

$$H_{k,m} = H_{k,k+1} \cdots H_{m-2,m-1} H_{m-1,m} \quad (13)$$

To project point $[x,y]^T$ or line ax+by+c=0 from a first top-view image m to a second top view image k, the following equations can used:

$$\begin{bmatrix} x_k \\ y_k \\ 1 \end{bmatrix} = H_{k,m} \begin{bmatrix} x_m \\ y_m \\ 1 \end{bmatrix}, \begin{bmatrix} a_k \\ b_k \\ c_k \end{bmatrix} = (H_{k,m}^T)^{-1} \begin{bmatrix} a_m \\ b_m \\ c_m \end{bmatrix}, \quad (14)$$

$$\begin{bmatrix} x_m \\ y_m \\ 1 \end{bmatrix} = H_{m,k}^{-1} \begin{bmatrix} x_k \\ y_k \\ 1 \end{bmatrix}, \begin{bmatrix} a_m \\ b_m \\ c_m \end{bmatrix} = H_{k,m}^T \begin{bmatrix} a_k \\ b_k \\ c_k \end{bmatrix}$$

Using equation (14) detected kerbs are transformed to the reference frame k in order to obtain line parameters in the common coordinate system.

In one embodiment the three parameters of the line equation can be transformed into an equivalent angle-distance representation $$d = x\cos\theta + y\sin\theta, \quad (15)$$

so that the line corresponds to a point in the (θ,d)-space.

A real kerb results in many detections in subsequent frames that result in similar lines in the reference (θ,d)-space.

Similar lines form a cluster in that space, while false detections are usually scattered randomly. Any clustering algorithm can be used to detect significant point clusters in the (θ,d)-space, and output the cluster centres as a final result of the kerb detection algorithm.

The detected cluster centre can then be transformed back to the current frame using equation (14) and be passed to other electronic control systems 25 of the vehicle 2. Any optional filtering schemes can be also implemented. For example, the detected line can be used for predicting search regions in future frames.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

Throughout the specification, the terms "including" and "in which" are used as the plain-English equivalents of the respective terms "comprising" and "wherein," respectively.

Moreover, the terms "first," "second," and "third," etc., are used merely as labels, and are not intended to impose numerical requirements on or to establish a certain ranking of importance of their objects.

REFERENCE NUMERALS 1 image recognition system
2 vehicle
3-1-3-6 camera units
4-1-4-6 image data
5 first image processor
6, 6-1-6-4 first top-view image
7 first feature extractor
8, 8-1-8-4 lines
9 second feature extractor
10 optical flow
11 second top-view image
12 kerb detector
13 kerb data
14 first set
15 first subset
16 second subset
17 motion model calculator
18 fitted global motion model
19 noise distribution
20 memory
25 vehicle system
X threshold

The invention claimed is:

1. An image recognition system for a vehicle comprising:
at least two cameras, each camera configured to record an image of a road in the vicinity of the vehicle and to provide image data representing the respective image of the road;
a first image processor configured to combine the image data provided by the at least two cameras into a first top-view image, wherein the first top-view image is aligned to a road image plane;
a first feature extractor configured to extract lines from the first top-view image;
a second feature extractor configured to extract an optical flow from the first top-view image and a second top-view image, which was generated before the first top-view image by the first image processor; and a kerb detector configured to detect kerbs in the road based on the extracted lines and the extracted optical flow and provide kerb data representing the detected kerbs, wherein the second feature extractor is configured to extract the optical flow as a first set of optical flow vectors, wherein the kerb detector is configured to separate the first set of optical flow vectors into a first subset of optical flow vectors and a second subset of optical flow vectors for the extended lines based on relative location between the optical flow vectors, the extracted lines, and the vehicle, wherein the kerb detector comprises a motion model calculator, which is configured to calculate at least a fitted global motion model comprising a rotation and a translation, based on the first set of optical flow vectors, and based on inline vectors of the first set of optical flow vectors, and wherein the kerb detector is configured to calculate based on the at least one fitted global motion model for every detected line a first noise distribution for the respective first subset and a second noise distribution for the respective second subset and detect a kerb at the position of the respective line if the difference between the first noise distribution and the second noise distribution exceeds a predetermined threshold.

2. The image recognition system according to claim 1, wherein the first feature extractor is configured to execute a line extraction algorithm.

3. The image recognition system according to claim 1, wherein the second feature extractor is configured to extract the optical flow as the first set of optical flow vectors based on a sparse optical flow detection from the first top-view image and the second top-view image, using feature-matching or block-matching.

4. The image recognition system according to claim 3, wherein for each detected line the first subset of optical flow vectors represents optical flow vectors, which are located on the same side of the respective detected line as the vehicle; and wherein for each detected line the second subset of optical flow vectors represents optical flow vectors, which are located on the opposite side of the respective detected line as the vehicle.

5. The image recognition system according to claim 4, wherein the kerb detector is configured to test for every detected line whether the respective first subset of optical flow vectors and the respective second subset of optical flow vectors belong to the same surface and detect a kerb where the respective first subset of optical flow vectors and the respective second subset of optical flow vectors do not belong to the same surface.

6. The image recognition system according to claim 5, wherein the kerb detector is configured to detect and delete outliers in the first subset of optical flow vectors and the second subset of optical flow vectors prior to testing the first subset of optical flow vectors and the second subset of optical flow vectors.

7. The image recognition system according to claim 5, wherein the kerb detector comprises a memory configured to store the positions of the detected kerbs in different moments of time and the respective fitted global motion models; and wherein the kerb detector is configured to combine the stored positions of the detected kerbs and the respective fitted global motion models to provide a kerb detection with a stronger evidence of the respective kerb.

8. The image recognition system according to claim 1, comprising only one single camera;

wherein the first image processor is configured to generate the first top-view image based on two consecutive sets of image data which are based on two images consecutively recorded by the single camera unit while the vehicle is in motion.

9. A method for recognising images in a vehicle, comprising:

recording with at least a first camera and a second camera at least two different images of a road in the vicinity of the vehicle and providing image data representing the respective images of the road;

combining the provided image data into a first top-view image, wherein the first top-view image is aligned to a road image plane;

extracting lines from the first top-view image;

extracting an optical flow as a first set of optical flow vectors from the first top-view image and a second top-view image, which was generated before the first top-view image;

separate the first set of optical flow vectors into a first subset of optical flow vectors and a second subset of optical flow vectors for the extended lines based on relative location between the optical flow vectors, the extracted lines, and the vehicle;

detecting kerbs in the road based on the extracted lines and the extracted optical flow; and providing kerb data representing the detected kerbs, wherein detecting kerbs comprises calculating at least a fitted global motion model, comprising a rotation and a translation, based on the first set of optical flow vectors, and based on inline vectors of the first set of optical flow vectors, and wherein detecting kerbs comprises calculating for every detected line a first noise distribution for the respective first subset and a second noise distribution for the respective second subset and detecting a kerb at the position of the respective line if the difference between the first noise distribution and the second noise distribution exceeds a predetermined threshold.

10. The method according to claim 9, wherein extracting lines comprises executing a line extraction algorithm; and/or wherein extracting the optical flow comprises extracting the optical flow as the first set of optical flow vectors based on a sparse optical flow detection from the first top-view image and the second top-view image using feature-matching or block-matching.

11. The method according to claim 10, wherein for each detected line the first subset of optical flow vectors represents optical flow vectors, which are on the same side of the respective detected line as the vehicle; and wherein for each detected line the second subset of optical flow vectors represents optical flow vectors, which are on the opposite side of the respective detected line as the vehicle.

12. The method according to claim 11, wherein detecting kerbs comprises testing for every detected line whether the respective first subset of optical flow vectors and the respective second subset of optical flow vectors belong to the same surface and detecting a kerb where the respective first subset of optical flow vectors and the respective second subset of optical flow vectors do not belong to the same surface; and wherein detecting kerbs comprises detecting and deleting outliers in the first subset of optical flow vectors and the second subset of optical flow vectors prior to testing the first subset of optical flow vectors and the second subset of optical flow vectors.

13. The method according to claim 11, wherein detecting kerbs comprises storing the positions of the detected kerbs in different moments of time and the respective fitted global motion models; and wherein detecting kerbs comprises combining the stored positions of the detected kerbs and the respective fitted global motion models to provide a kerb detection with a stronger evidence of the respective kerb.

14. The image recognition system according to claim 2, wherein the line extraction algorithm is a Hough transform algorithm.

15. The image recognition system according to claim 6, wherein the kerb detector comprises a motion model calculator, which is configured to calculate at least a fitted global motion model comprising a rotation and a translation, based on the first set of optical flow vectors, based on the inline vectors of the first set of optical flow vectors; and wherein the kerb detector is configured to calculate based on the at least one fitted global motion model for every detected line a first noise distribution for the respective first subset and a second noise distribution for the respective second subset and detect a kerb at the position of the respective line if the difference between the first noise distribution and the second noise distribution exceeds a predetermined threshold.

16. The method according to claim 10 a Hough transform wherein the line extraction algorithm is a Hough transform algorithm.

17. The method according to claim 12, wherein detecting kerbs comprises calculating at least a fitted global motion model, especially comprising a rotation and a translation, based on the first set of optical flow vectors, especially based on the inline vectors of the first set of optical flow vectors; and wherein detecting kerbs comprises calculating for every detected line a first noise distribution for the respective first subset and a second noise distribution for the respective second subset and detecting a kerb at the position of the respective line if the difference between the first noise distribution and the second noise distribution exceeds a predetermined threshold.

* * * * *